US005303401A

United States Patent [19]

Duckeck et al.

[11] Patent Number: 5,303,401

[45] Date of Patent: Apr. 12, 1994

[54] RDS RECEIVER WITH AUTOMATIC REGION RECOGNITION

[75] Inventors: Ralf Duckeck; Peter Braegas, both of Hildesheim, Fed. Rep. of Germany

[73] Assignee: Robert Bosch GmbH, Stuttgart, Fed. Rep. of Germany

[21] Appl. No.: 834,294

[22] PCT Filed: Oct. 19, 1990

[86] PCT No.: PCT/DE90/00794

§ 371 Date: May 4, 1992

§ 102(e) Date: May 4, 1992

[87] PCT Pub. No.: WO91/07029

PCT Pub. Date: May 16, 1991

[30] Foreign Application Priority Data

Nov. 3, 1989 [DE] Fed. Rep. of Germany ....... 3936577

[51] Int. Cl.[5] ............ H04B 1/16

[52] U.S. Cl. ............ 455/186.1; 455/38.4; 455/345

[58] Field of Search ............ 455/38.2, 38.4, 45, 455/185.1, 186.1, 186.2, 345; 340/905

[56] References Cited

U.S. PATENT DOCUMENTS

| | | | |
|---|---|---|---|
| 4,862,513 | 8/1989 | Brägas | 455/45 |
| 4,907,159 | 3/1990 | Mauge et al. | 364/436 |
| 4,969,209 | 11/1990 | Schwob | 455/158 |
| 5,095,532 | 3/1992 | Mardus/Bosch | 455/186 |

FOREIGN PATENT DOCUMENTS

| | | | |
|---|---|---|---|
| 3332987 | 1/1985 | Fed. Rep. of Germany . | |
| 3536820 | 4/1987 | Fed. Rep. of Germany . | |
| 3724516 | 2/1989 | Fed. Rep. of Germany . | |
| 3506161 | 10/1989 | Fed. Rep. of Germany . | |
| 0136828 | 7/1988 | Japan | 455/185.1 |
| 0155315 | 6/1990 | Japan | 455/185.1 |

OTHER PUBLICATIONS

European Broadcasting Union Technical Standard 3244-E, entitled Specifications Of The Radio Data System RDS For VHF/FM Sound Broadcasting, EBU Technical Centre-Brussels, Mar. '84, pp. 12+29.

*Primary Examiner*—Reinhard J. Eisenzopf
*Assistant Examiner*—Chi Pham
*Attorney, Agent, or Firm*—Frishauf Holtz Goodman & Woodward

[57] ABSTRACT

A radio receiver, in particular for vehicles, is proposed that is equipped with a decoder for decoding digitally encoded traffic news received, in particular in accordance with the RDS system. A station memory is also provided, in which all the receiver radio stations are stored in memory at regular intervals. This table is compared with a table stored in a memory of the receiver, in which the radio stations are assigned to certain regions. If a predominant match between the received radio stations and the stored radio stations is ascertained, then the associated region is output, and only traffic news associated with the applicable region is output.

3 Claims, 3 Drawing Sheets

RDS RECEIVER WITH AUTOMATIC REGION RECOGNITION

FIELD OF THE INVENTION

The invention relates to a radio receiver, in particular for vehicles, having a decoder for decoding digitally encoded traffic reports received.

BACKGROUND

German Patent Disclosure Document DE-OS 35 36 820 Bragas and Busch/BOS a traffic broadcast decoder that is arranged to process digital signals. These digital signals are for instance superimposed on an auxiliary carrier that is broadcast by radio stations, or transmitters, together with the FM radio program. As a result, the information present in these digital signals can be transmitted unimpeded, parallel with the actual radio program. This applies particularly to traffic news, which can be decoded by demodulation of the aforementioned auxiliary carrier. Besides signal transmission by means of auxiliary carriers, however, it is also possible for these digital signals to be supplied to a digital radio transmitter, for instance interlaced with the digital radio information.

If the traffic news transmitted as digital signals is formatted on the same principle as traffic news broadcast in the clear, then instead of the complete information, it is also possible to transmit memory addresses, which invoke standardized texts stored in memories in the receivers. This makes a substantially smaller data capacity adequate for transmission. As a consequence, substantially more traffic news on individual events can be provided than was the case previously.

While keeping the same selection criteria as before for the traffic news, which depends essentially on the number of drivers affected, traffic news relating to a larger, supraregional geographical area, e.g. the region of the Federal Republic of Germany and possibly the neighboring countries, could also be transmitted over all the chains of FM stations. Another possibility is to restrict the region into which the traffic news relates to approximately the region supplied by the station or chain of stations, but in return to expand the selection of traffic news to events that affect even only a few drivers.

Whatever selection is made for the traffic news transmitted, the great number of reports would be excessively demanding of the driver's attention if he received them all in a visual or acoustic form.

It has already been proposed that a selection from among the traffic news be made to decide what will be displayed or reproduced. This can be done for instance in terms of the intended trip route, which the driver has input via an input device in the form of data on the section of highway to be traveled. It is then assured that only the traffic news that applies to that trip route will appear on the output device.

Still, making a limitation to the trip route selected may be too narrow, if the driver should become interested in the traffic situation elsewhere or in relatively persistent bottlenecks in other places, because he might wish to drive to those places soon.

In German Patent Application P 39 14 104.7 and corresponding PCT/DE 90/00250, the publishing dates which do not precede the international filing date of the present application, it has already been proposed that a selector be provided in the radio receiver, by means of which the radio receiver user can individually specify a region for which he wishes to have information on the traffic situation. Based on this specification, a station is then sought that essentially transmits information on this region. It is also possible as a result to incorporate filters that filter out traffic news beyond the local region that is for instance also broadcast by the same station, so that only the information that actually refers to the selected region is output.

Manually inputting a certain region makes input means such as keyboards a prerequisite, and it is also somewhat inconvenient for the user, because if he wishes to obtain the regional traffic news he has to input the applicable region first. Often, therefore, he does not bother, and so the danger still exists that the radio user will either be overwhelmed by unnecessary information or, having tuned to a station from a different region, will either not receive the desired traffic news, or will not receive all of it.

THE INVENTION

The radio receiver according to the invention has the advantage over the prior art that it is automatically capable of determining the region in which the radio receiver is presently being operated. This makes it possible to select the traffic information transmitted in accordance with that region so that only traffic news applying to that region to be output. With only slightly increased effort, namely the evaluation of the program identification code, it is possible to increase the reliability with which the region is determined. Because of this provision, reliable region determination is attainable even if the same station distribution might coincidentally prevail at more than one location. Because of the program identification (PI) code, a reliable association of the regions, even for relatively small regions, is still possible.

DRAWINGS

Exemplary embodiments of the invention are shown in the drawing and described in further detail in the ensuing description.

FIG. 1 shows a radio receiver according to the invention;

FIG. 2, in an excerpt, shows an important detail of the radio receiver according to the invention; and FIG. 3 shows a further, simpler possibility for embodiment of the radio receiver according to the invention.

DETAILED DESCRIPTION

Figure 1:
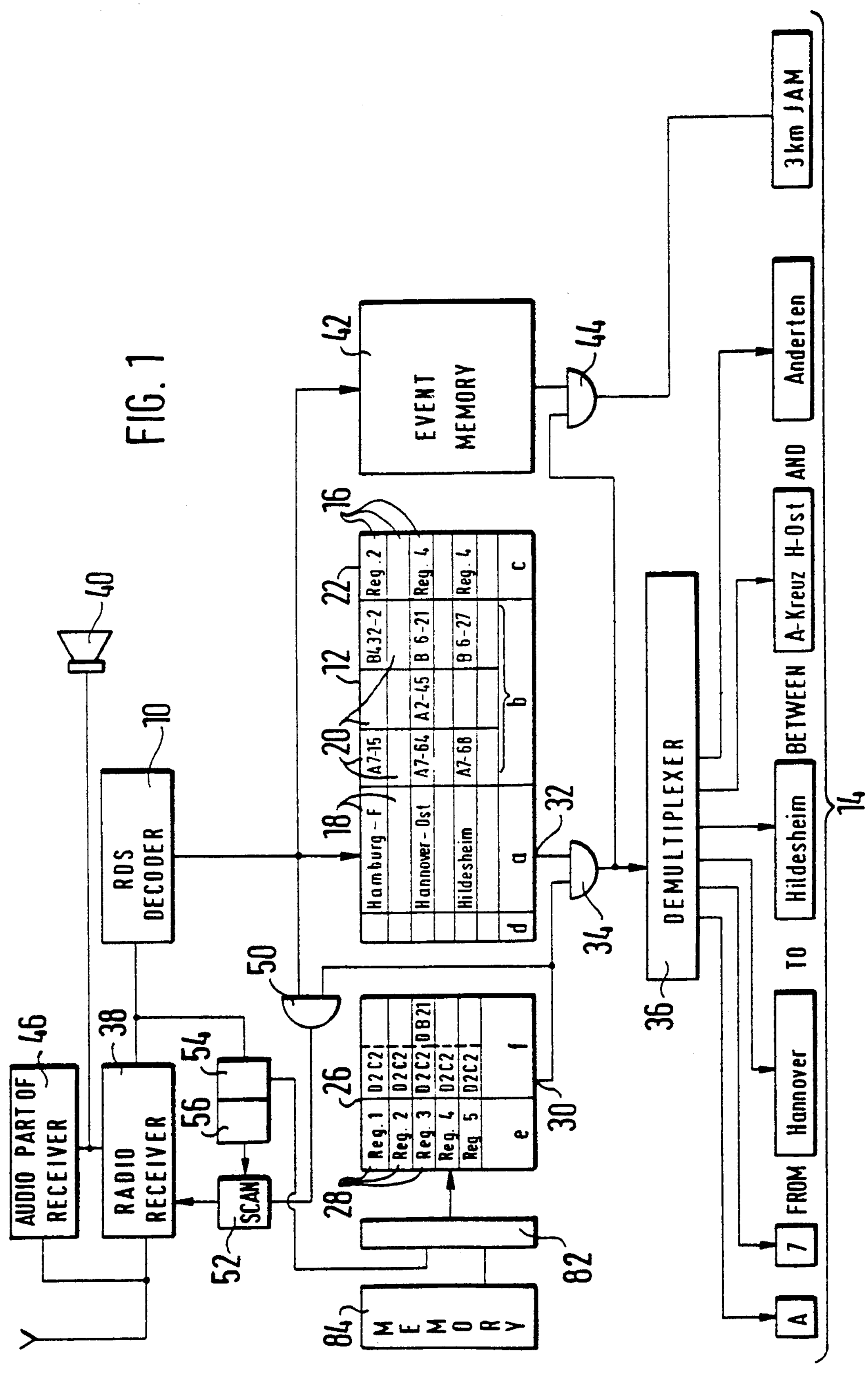

FIG. 1 shows a vehicle receiver that has a first receiving part 46 with a loudspeaker 40, for receiving the usual program, and includes a further receiving part 38, with a decoder 10 connected to the output side of the receiver part 38, for decoding digitally encoded traffic news and program identification codes received.

The decoder 10 is connected to address inputs of a memory device 12. The memory device 12 includes memory fields 16 with memory locations 18, 20 and 22, which car be selected via addresses. Connected to the memory device 12 is a logical linking element 34, which via a demultiplexer 36 leads to a visual output device 14. An event memory 42 is also provided, the address inputs of which are also triggered by the decoder 10, and which leads via a further logical linking element 44 to a further field of the visual output device 14. A further memory device 26 is also provided, which includes memory fields 28 for region identifiers e and program identification codes f. One output 30 of the memory device 26, like the output 32 of the aforementioned memory device 12, is connected to the logical linking element 34.

The circuit arrangement also has a memory 54, in which all the stations that can be received on one scan through the stations by the receiver 38 are stored. A selection circuit 56 is also provided, in which the stations that are received best are stored. Finally, with the selection circuit 56, the memory 54 is connected to a station scanner 52, by means of which it is possible on the one hand to have the receiver 38 scan in order to find which stations can be received, and on the other hand the station that can be received best can be set as desired. A linking element 50 is also provided, to which on the one hand the data of the memory 26 on the other program identification codes from the decoder 10 can be supplied. The output of the linking element 50 leads to an alternative input of the station scanner 52.

In the memory 84, the frequencies that can be received or the program identification codes are stored, subdivided by region. In a comparator 82, they are compared with the stations stored in the memory 54. The outcome of the comparison is supplied to the memory 26.

In the memory device 12, memory fields 16 are addressed via addresses d, which are accessed by means of data of the decoder 10. The memory fields 16 are subdivided into memory locations 18 for place names a, memory locations 20 for other characteristics b specific to highway segments, such as Autobahns or Federal highways with exit numbers, and memory locations 22 with region identifiers c. In the present case, only one region identifier c is assigned to each place name a. In the case of redundancies, however, it is also possible to use a plurality of region identifiers c. Moreover, the region identifiers c can have a hierarchical structure, so that once again a coarse or fine subdivision can successfully be made. For instance, it is possible to subdivide the regions 2 into subregions 21, 22, etc., and the region 21 into subregions 211, 212, etc., so that fine graduations, especially for large cities, are then also possible.

The memory device 26 also includes addressable memory fields 28. Here, region identifiers e, of the kind that are also present as region identifiers c in the memory locations 22 of the memory device 12, are stored in the memory fields 28. The memory fields 28 also contain program identification codes f for those stations or chains of stations that are responsible for traffic news for the applicable regions having the region identifiers e. One or more program identification codes f can be assigned to each region identifier e.

If the receiver is intended to receive traffic news transmitted by the RDS system over the traffic message channel, then the program identification code matches the PI code in accordance with the EBU specifications, of the kind in block 1 in every RDS (Radio Data System) group. The program identification code then includes four characters. The first character identifies the country, and for the Federal Republic of Germany and Libya, for instance, it is the letter D. The second character represents a zone identifier, which in the Federal Republic of Germany, for instance, matches the traffic zones A–F of the presently known traffic radio system. The third and fourth characters, finally, stand for a station or chain of stations of a radio network. For example, the PI code for NDR2 [Norddeutsche Rundfunk 2=North German Radio Program 2] is D2C2.

Figure 2:
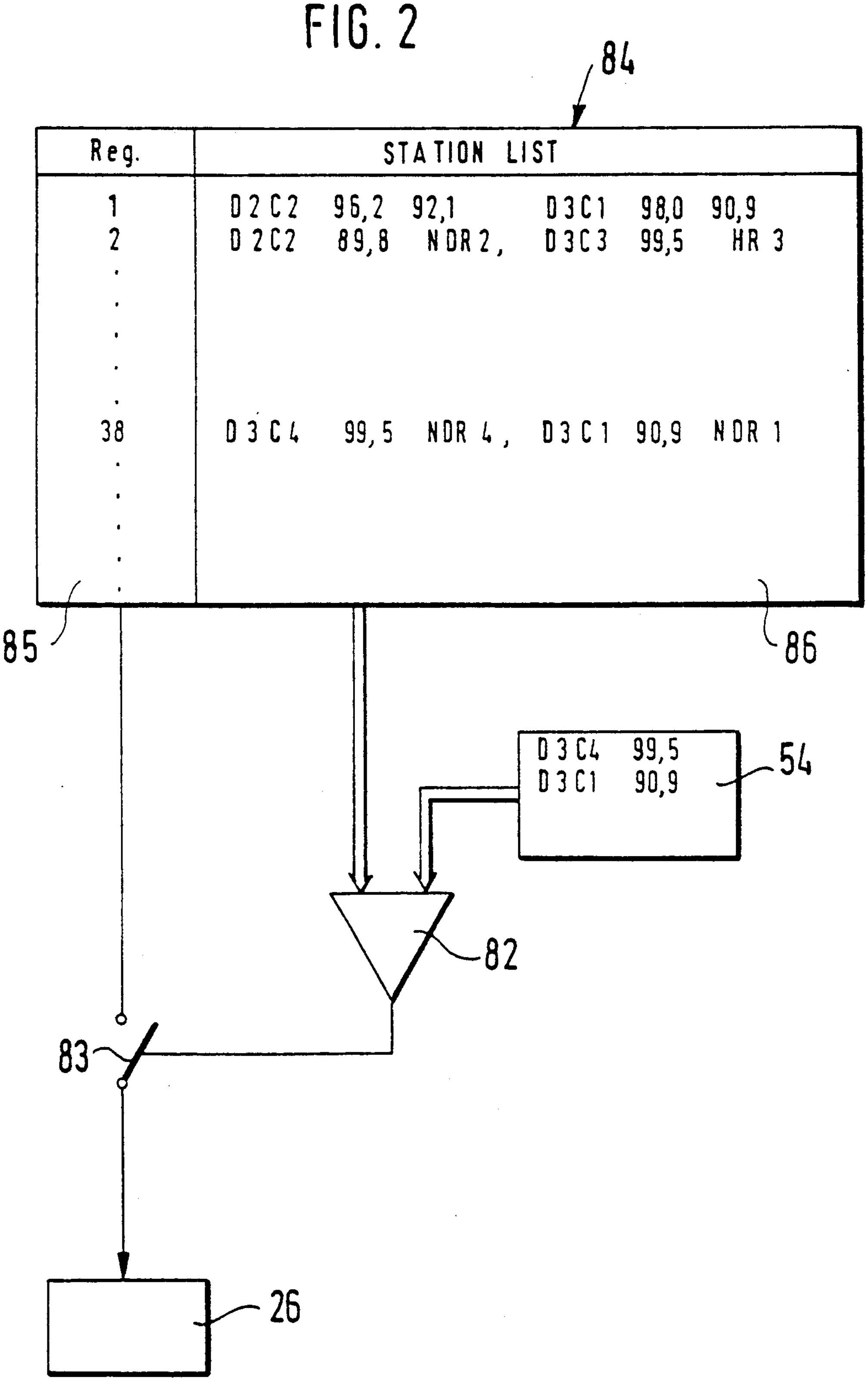

Details of the automatic region identification will now be explained in further detail, referring to FIG. 2. FIG. 2 again shows the further memory 84, with a memory part 85 in which the regions are listed, opposite which is a corresponding table 86 in which the stations that can be received in the region are listed; both the PI codes and the frequencies that can be received under that PI code are listed. The table shown is purely by way of example; in particular, the list of stations can be supplemented with an arbitrary number of PI codes or frequencies. The table 86 is now compared in the comparator 82 with the table that is stored in the memory 54 of the radio receiver during one station scan. If the comparator finds a match between the table in memory 54 and one of the tables in memory 86, then the comparator 82 furnishes an output signal, so that via the switch 83 the region, in which a match is found, between the stations and program identification codes memorized and the stations and program identification codes received, is gated through to the memory 26. The match need not be absolute; it suffices if at least a predominant match between the received stations and program identification codes and the table exists, so that the automatic region selection still continues to function even if a station has for instance dropped out or if a station was not picked up because of obstructions or other poor reception conditions, or if a station that usually cannot be received in this region was received because of reflections or over-the-horizon reception. This region, for instance region 2, is then read out of the memory 26 and now affects the logical linking element 34 in such a way that only the traffic news items that pertain to region 2, for instance the 1 in the memory 12, are admitted. Thus, element 34 is essentially a filtering means.

Finally, it is also possible to deliver the output 30 of the memory 26 to one input of the comparison circuit 50, while the other input of the comparison circuit 50 communicates with the output of the decoder 10, and to invoke the program identification code there. This provision makes it possible to affect the station scan 52 so that it is assured that in all cases, a station that is broadcasting traffic news for the applicable region will be received. This is especially necessary for instance if city information is to be received from a local station that may not be the most powerful station, since powerful stations are typically better suited for supraregional handling of traffic information.

Figure 3:
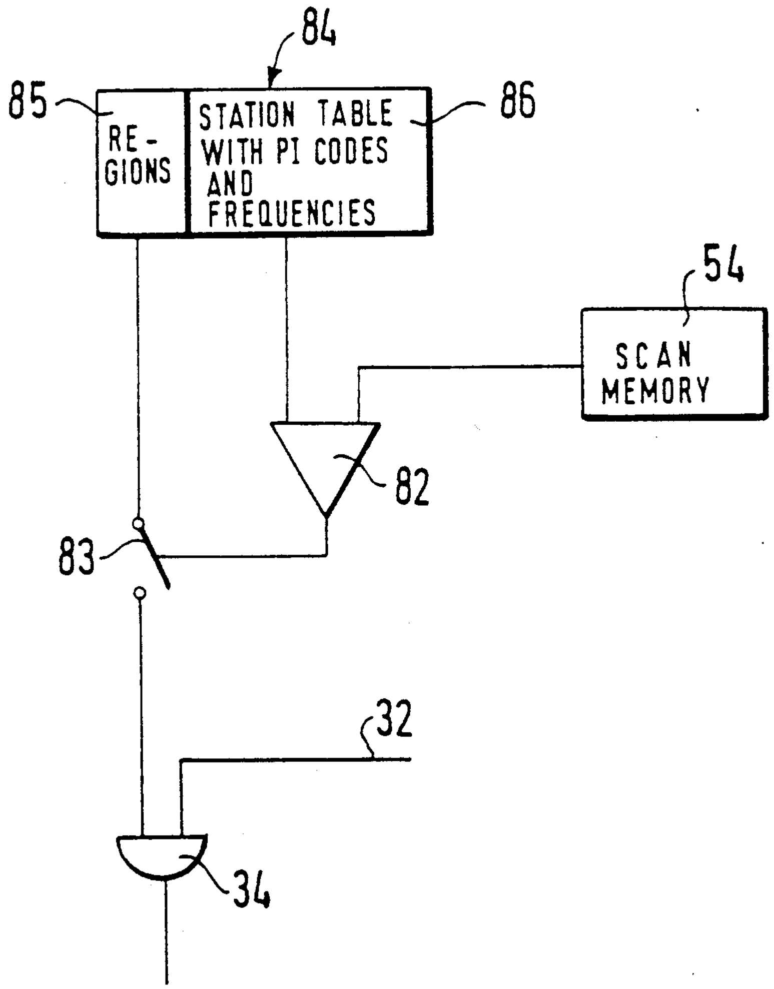

FIG. 3 shows the embodiment of an especially simple receiver according to the invention. Once again, the memory 84 can be seen, in which the regions are stored in the memory part 85, while the memory part 86 contains station tables assigned to these regions, but only the frequencies and not the program identification codes are stored there. Similarly, in the memory 54 that contains the receivable frequencies, only the frequency of the received stations is stored, but not the program identification code. In the comparator 82, a comparison of the received frequencies with the stored frequencies in accordance with table 86 is performed, and the switch 83 is then closed if a predominant match is found between the stored and the received frequencies. The region in which the best match is attained is then supplied directly to the logical linking element 34, however, the other input of which is connected to the output 32 of the memory 12 of FIG. 1. The traffic news pertaining to that region is then passed on directly to the demultiplexer 36. With this embodiment of the invention, the evaluation of the program identification code is omitted. It is generally presumed that the most powerful station, stored in the evaluation circuit 56, also includes the traffic radio information for the region, so that the program identification codes stored in the memory 26 are not needed. It is also presumed that station lists that differ markedly from one another are assigned to different regions, so that for the purposes of more detailed identification of the station lists, the program identification code can be dispensed with. It is readily apparent that in an embodiment in accordance with FIG. 3, the memory 26 and the comparator 50 are no longer needed, so that the memory capacity required in the radio receiver, and the evaluation, can be simplified considerably.

Based on the frequencies received, it is now possible to ascertain the region in which the radio receiver is located, and with the linking circuit 34 it is now possible to enable only the traffic news associated with a certain region. Depending on the extent of the memory 84 and on the layout of the table, it is possible to define the regions as virtually arbitrarily small. For instance, with simpler equipment it is conceivable to subdivide the regions rather coarsely, while equipment with a relatively wide memory range can have correspondingly many subregions.

We claim:

1. A receiver, having means for simultaneously tuning and processing a signal intended for audio reproduction (46, 40) and an auxiliary digital signal (38);

a decoder (10), coupled to an output of said tuning and processing means, for decoding digitally encoded traffic news contained in said auxiliary signal;

a memory device (12), coupled to an output of said decoder, and pre-programmed with a table associating highway numbers and highway access point numbers with specific respective geographic regions;

means (34) for filtering a stream of information from said decoder (10) and said pre-programmed memory device (12); and means (14) for indicating to a user, by at least one of visual output and audio output, information selected by said filtering means (34);

further comprising, in accordance with the invention, means (52), coupled to a control input of said tuning means, for directing a scan of a predetermined frequency band;

a rewritable scan memory (54), coupled to an output of said tuning means, storing frequencies of stations detected during said scan;

a further memory (84) which includes a list of geographic regions (85) and the frequencies (86) of stations receivable in each region;

a comparison device (82), coupled to respective outputs of said scan memory (54) and of said further memory (84), which compares the frequencies received during said scan with the frequencies (86) stored in said further memory, to find an at least partial match between the received and the stored frequencies, thereby automatically recognizing in which geographic region said scan was performed, and outputs, to said filtering means (34), a number identifying said recognized region;

said filtering means (34) subsequently limiting output of information via said indicating means (14), to traffic news relevant to said recognized region.

2. The Radio Data System (RDS) receiver of claim 1, wherein said decoder (10) also decodes program identification codes transmitted as part of said digital signal;

said further memory (84) contains, for each of said receivable stations data on both its frequency and its program identification code; and said comparison device, while making said at least partial match, compares the frequencies and program identification codes of received stations to the frequencies and program identification codes stored in said further memory (84).

3. The Radio Data System (RDS) receiver of claim 2, further comprising a supplementary memory (30), associating region (e) and program identification codes (f), means in said comparison device (82) for simultaneously specifying a desired region and a desired program identification code, from among those stored in said supplementary memory (3), and logic means (50), having inputs connected to respective outputs of said supplementary memory (30) and of said decoder (10), and an output coupled to a control input of said scan directing means (52), whereby said logic means (50) limits said scan directing means (52) to selection of stations matching both said desired region and said desired program identification code.

* * * * *